Patented May 11, 1943

2,318,609

UNITED STATES PATENT OFFICE 2,318,609

DEGRADATION PRODUCTS CONTAINING CARBOXYL GROUPS FROM COMPOUNDS OF THE OESTRANE SERIES AND A METHOD OF MAKING THE SAME

Walter Hohlweg, Hohen Neuendorf, near Berlin, and Hans Herloff Inhoffen, Berlin-Wilmersdorf, Germany, assignors to Schering Corporation, Bloomfield, N. J., a corporation of New Jersey No Drawing. Application December 14, 1938, Serial No. 245,594. In Germany December 18, 1937

17 Claims. (Cl. 260—397.1)

This invention relates to degradation products containing carboxyl groups from compounds of the oestrane series and a method of making the same.

From the United States Patent No. 2,069,096 it is known that oestrone and oestriol are converted by oxidising agents into physiologically active degradation products wherein at least two of the four rings of the original unoxidized substance are present and wherein the phenolic ring is unoxidized, said oxidation products being solids of definite melting point when in the pure state and containing at least one carboxylic acid group.

In accordance with the present invention, in the treatment of oestradiol as starting material with oxidising agents, in particular when this substance is subjected to fusing with alkali hydroxide in air, degradation products containing carboxyl groups are likewise obtained. In this case the yield is considerably better than when using oestrone and oestriol as starting material. Thus, for instance, when oxidizing 1 gram of oestrone in the manner described in the U. S. Patent No. 2,069,096, 143 mg. of the acid are obtained, the physiological activity of these 143 mg. corresponding to about 51,000 peroral rat units; while when proceeding according to this invention 1 gram of oestradiol under the same conditions yields 455 mgs. of the same acid with a total physiological activity of about 182,000 peroral rat units. Instead of oestradiol also other 17-alcohols of the dehydrooestrane series, having only one hydroxyl attached to the cyclopentano ring, as for example dihydro-equilin, dihydro-equilenin, isooestradiol and similar compounds can be used. A further advantage of this invention consists in providing new and useful acids from dihydroequilin and dihydroequilenin. These acids, surprising to say, differ from those known by the above mentioned U. S. Patent 2,069,096 by their higher physiological activity. Hence, this invention allows the utilization of the unsaturated less active substances accompanying oestrone in the urine of pregnant mares by converting them into perorally highly active compounds.

Preferably, the phenolic hydroxyl group is protected against oxidation by conversion into a group that is reconvertible into a hydroxy group, such as an ester-, ether, amino group, halogen or the like.

Of course other oxidation methods can be used likewise, such as oxidation with potassium permanganate, chromium trioxide and other methods known to those skilled in the art.

In a modified process according to this invention it is also possible to proceed in such a manner that from the above specified 17-alcohols of the oestrane series the 17-alcohol group is first split off either directly, for instance, according to the method of Tschugajeff or by any other known method of splitting off water between a hydroxy group and a neighboring $CH_2$-group (compare Houben-Weyl, "Methoden der organischen Chemie" 3rd edition, vol. 3, page 117 et seq.) or indirectly, for instance, by first converting the 17-hydroxy group into the 17-halogen group and splitting off halogen hydride as described by Houben, "Die Methoden der organischen Chemie," 3rd edition, vol. 3, pages 1115–1128 and vol. 2, pages 947–960, and the unsaturated compounds thus obtained subjected to an oxidation in which carboxylic acids are formed. For the rupture of the olefinic double bond thereby first produced, such oxidising agents are suitable as are described in Houben-Weyl "Methoden der organischen Chemie" 3rd edition, vol. 2, page 165 et seq.

Of particular value has proved in the case of these unsaturated compounds the application of ozone as oxidising agent.

The degradation products of the oestradiols containing carboxyl groups thus produced are shown to be extroardinarily active both in animal experiments in the Allen-Doisy test and also clinically.

The following examples illustrate the invention:

Example 1

1 gram of oestradiol is mixed with 20 grams of powdered potassium hydroxide whereupon the mixture is heated in air in a silver crucible for 1 hours to about 260–280° C. After cooling, the reaction mixture is taken up in water and filtered off from undissolved portions. The filtrate is saturated with carbon dioxide and the produced precipitate filtered. The clear solution is acidified with concentrated hydrochloric acid, whereupon the acid is liberated and precipitates in crystalline form. The product is filtered off, washed with water and dried. From the mother liquor by extraction with ether a further quantity of acid reaction product can be obtained.

The almost pure crude product melts at 180–183° C.; the yield equals 400 mg. The acid can be further purified by recrystallisation from dilute alcohol.

A corresponding oxidation product is obtained when first the oestradiol is treated with water splitting agents and the unsaturated compound obtained reacted with ozone.

Example 2

1 gram of oestradiol is mixed with 50 grams of potassium hydroxide and 7 ccs. of water and heated in air up to 275° C. at which temperature the reaction mixture is kept for 1¼ hour. After cooling, dissolving in water and filtering, carbon dioxide is passed through the filtrate for about 12 hours, whereupon the precipitate is removed by filtration. The filtrate is then acidified by means of hydrochloric acid, the precipitate filtered off by suction, washed with water and dried. 450 mgs. of a white powder having a melting point of 191–193° C. are obtained. The acid exhibits an oral physiological activity of 2,5γ/R.U.

Example 3

1 gram of dihydroequilin is mixed with 50 grams of potassium hydroxide and 7 ccs. of water in a silver crucible and heated for 1¼ hours to 275° C. After cooling the reaction product is dissolved in water, the aqueous solution is filtered and into the filtrate there is passed carbon dioxide for about 12 hours. After filtration the solution is acidified by means of hydrochloric acid, the precipitate filtered off by suction, washed with water and dried. The yield amounts to 252 mgs. of a white powder having a melting point of 100–110° C. and an activity of 0.6γ/R.U.

Example 4

1 gram of dihydroequilenin mixed with 50 grams of potassium hydroxide and 7 ccs. of water, is heated in a silver crucible to 260° C. in air and kept for 1 hour at 260–280° C. After cooling the reaction product is dissolved in water, the aqueous solution is filtered and carbon dioxide is passed through the filtrate. After filtration the solution is acidified by means of sulfuric acid, the precipitate is filtered off by suction, washed with water and dried. 280 mgs. of a colorless acid of M. P. 110–120° C. are obtained having an oral activity of 0.5γ/R. U.

Of course, many other changes and variations in the reaction conditions, the oxidizing agents used, the temperature and so forth may be made by those skilled in the art in accordance with the principles set forth herein and in the claims annexed hereto.

What we claim is:

1. Process for the manufacture of degradation products containing carboxyl groups from compounds of the oestrane series, comprising subjecting a 3,17-dihydroxy-dehydro-oestrane compound to the action of an oxidizing agent.

2. Process as set forth in claim 1, wherein said 3,17-dihydroxy-dehydro-oestrane compound is subjected to fusion with an alkali metal hydroxide in the presence of oxygen.

3. Process as set forth in claim 1, in which as starting material dihydroequiline is used.

4. Process as set forth in claim 1, in which as starting material dihydroequilenine is used.

5. Process as claimed in claim 1, in which from said 3,17-dihydroxy-dehydro-oestrane compound the 17-alcohol group and a neighboring hydrogen atom are split off in the form of water.

6. Process as set forth in claim 1, wherein said 3,17-dihydroxy compounds of the dehydro-oestrane series are heated with fused potassium hydroxide.

7. Process for the manufacture of degradation products containing carboxyl groups from compounds of the oestrane series, comprising eliminating the 17-hydroxy group from a 3,17-dihydroxy-dehydro-oestrane compound and thereby introducing a double bond into the cyclopentano ring, and thereafter subjecting the unsaturated compound so formed to the action of an oxidizing agent which is capable of splitting a carbon-carbon double bond, whereby a compound having a carboxyl group is produced.

8. Process for the manufacture of degradation products containing carboxyl groups from compounds of the oestrane series, comprising eliminating the 17-hydroxy group from a 3,17-dihydroxy-dehydro-oestrane compound and thereby introducing a double bond into the cyclopentano ring, and thereafter subjecting the unsaturated compound so formed to the action of ozone to split the carbon-carbon double bond, thereby producing at least one carboxy group.

9. Process for the manufacture of degradation products containing carboxyl groups from a 3,17-dihydroxy compound of the dehydro-oestrane series, comprising splitting off the 17-alcohol group and a neighboring hydrogen atom of such compound in the form of water, and subjecting the resulting unsaturated compound to the action of ozone to split the carbon-carbon double bond and produce at least one carboxy group in the degraded molecule.

10. Process as set forth in claim 1, wherein the carboxylic acids are isolated from the oxidation mixture.

11. Process as set forth in claim 7, wherein the carboxylic acids obtained are isolated from the oxidation mixture.

12. Process for the manufacture of degradation products containing carboxyl groups from a 17-alcohol compound of the dehydro-oestrane series, comprising splitting off the 17-alcohol group and a neighboring hydrogen atom of such compound in the form of water, subjecting the resulting unsaturated compound to the action of an oxidizing agent capable of splitting a carbon-carbon double bond to form at least one carboxyl group, and isolating the carboxylic acid material thus obtained from the oxidation mixture.

13. Oxidation products of 3,17-dihydroxy compounds of the dehydro-oestrane series, wherein three of the four rings of the original unoxidized 17-alcohols are present and which contain at least one carboxyl group and a member of the group consisting of a phenolic hydroxyl group and groups capable of being transformed into the hydroxyl group, said oxidation products having an oral oestrogenic activity substantially higher than that of the unoxidized 17-alcohols.

14. Oxidation products of dihydroequiline, wherein three of the four rings of the original unoxidized oestradiol are present and which contain at least one carboxyl group and a member of the group consisting of a phenolic hydroxyl group and groups capable of being transformed into the hydroxyl group, said oxidation product having an oral oestrogenic activity substantially higher than that of dihydroequiline.

15. Oxidation products of dihydroequilenine, wherein three of the four rings of the original unoxidized oestradiol are present and which contain at least one carboxyl group and a member of the group consisting of a phenolic hydroxyl group and groups capable of being transformed into the hydroxyl group, said oxidation product having an oral oestrogenic activity substantially higher than that of dihydroequilenine.

16. Process for the manufacture of degradation products containing carboxyl groups from compounds of the oestrane series, comprising eliminating the 17-hydroxy group from a 3,17-dihydroxy-dehydro-oestrane compound and thereby introducing a double bond into the cyclopentano ring, and thereafter subjecting the unsaturated compound so formed to the action of an oxidizing agent which is capable of splitting a carbon-carbon double bond to yield a compound having two carboxyl groups.

17. Process for the manufacture of degradation products containing carboxyl groups from compounds of the oestrane series, comprising eliminating the 17-hydroxy group from a 3,17-dihydroxy-dehydro-oestrane compound and thereby introducing a double bond into the cyclopentano ring, and thereafter subjecting the unsaturated compound so formed to the action of an oxidizing agent which is capable of splitting a carbon-carbon double bond to yield a mixture of compounds having one and two carboxyl groups.

WALTER HOHLWEG.
HANS HERLOFF INHOFFEN.